(12) United States Patent
Fasel

(10) Patent No.: US 7,334,820 B2
(45) Date of Patent: Feb. 26, 2008

(54) CONCRETE PIPE WITH A CORROSION-RESISTANT INNER LINING

(75) Inventor: Stefan Fasel, Nisterau (DE)

(73) Assignee: Gebr. Fasel Betonwerk GmbH, Nisterau (DE)

( * ) Notice: Subject to any disclaimer, the term of this patent is extended or adjusted under 35 U.S.C. 154(b) by 0 days.

(21) Appl. No.: 11/068,665

(22) Filed: Feb. 28, 2005

(65) Prior Publication Data

US 2005/0189763 A1    Sep. 1, 2005

(30) Foreign Application Priority Data

Mar. 1, 2004   (DE) ............... 20-2004-003139 U

(51) Int. Cl.
*F16L 55/00* (2006.01)
(52) U.S. Cl. ........................ 285/55; 285/230
(58) Field of Classification Search ................ 285/230, 285/55, 54, 231
See application file for complete search history.

(56) References Cited

U.S. PATENT DOCUMENTS

| | | | | |
|---|---|---|---|---|
| 3,474,834 A | * | 10/1969 | Carey | 285/55 |
| 3,767,232 A | * | 10/1973 | Smith | 285/230 |
| 4,909,519 A | * | 3/1990 | Anderson | 285/230 |

FOREIGN PATENT DOCUMENTS

| | | |
|---|---|---|
| CH | 534321 | 4/1973 |
| DE | 202776 | 11/1971 |
| DE | G132729.3 | 6/1982 |
| DE | G8806158.2 | 2/1989 |
| DE | 4025603 | 2/1992 |
| DE | 298 04 587 | 5/1998 |
| DE | 101 09 415 | 9/2002 |
| DE | 10215059 | 2/2003 |
| EP | 0426147 | 5/1991 |
| FR | 2330942 | 6/1977 |

\* cited by examiner

*Primary Examiner*—Aaron Dunwoody
(74) *Attorney, Agent, or Firm*—Dilworth & Barrese LLP

(57) ABSTRACT

The invention relates to a concrete pipe having a corrosion-resistant inner lining consisting of plastic whose one end is made as a pipe spigot end piece and whose other end is made as a pipe socket end piece to receive a pipe spigot end part of the following pipe, with the plastic pipe projecting by an overhang at the pipe spigot end part, with an all-round peripheral groove being arranged at the pipe interior of the plastic pipe to accept an elastomer seal and with the overhang which extends in a straight line and is insertable into the pipe socket end part being so long that it covers the peripheral groove. In accordance with the invention, the inner lining consisting of plastic also lines the pipe socket end part of the concrete pipe.

15 Claims, 2 Drawing Sheets

CONCRETE PIPE WITH A CORROSION-RESISTANT INNER LINING

BACKGROUND OF THE INVENTION

Figure 1:
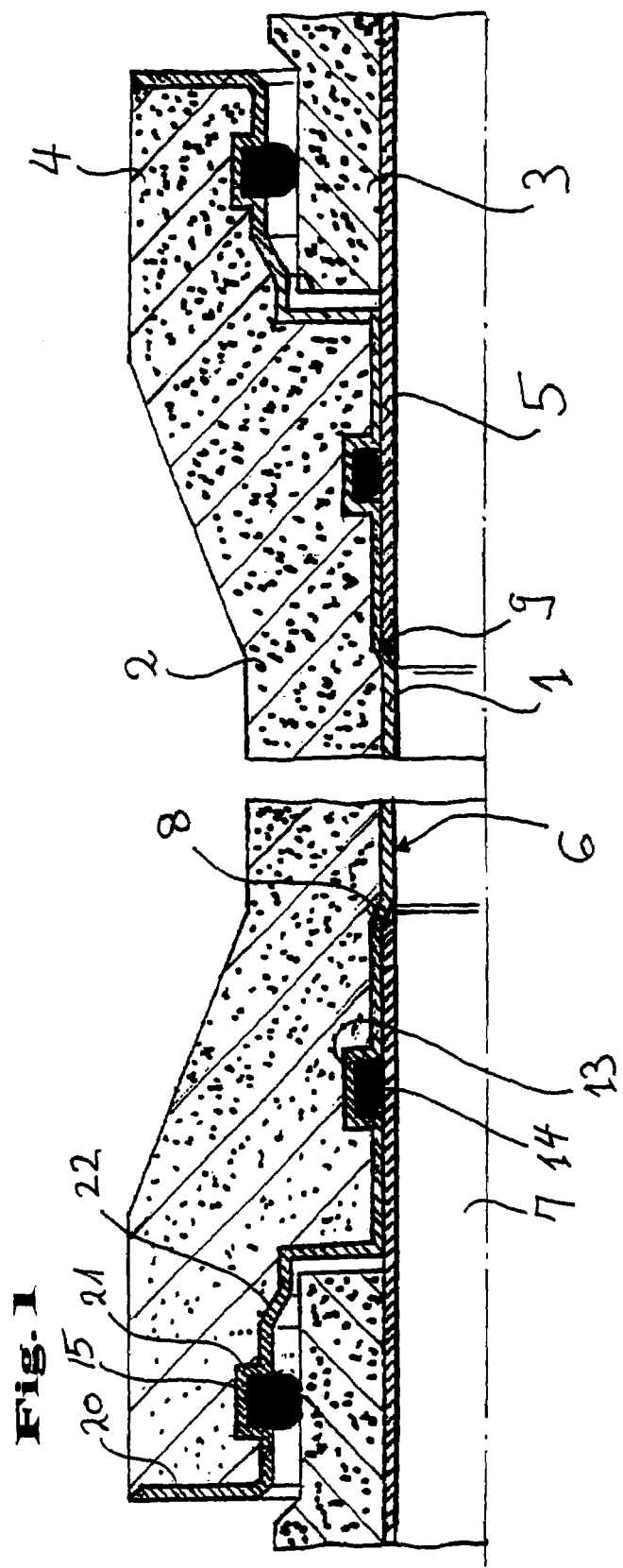

The invention relates to a pipe made of concrete having a corrosion-resistant inner lining consisting of a plastic pipe in accordance with the description herein.

The invention relates to a pipe made of concrete having a common-resistant inner lining consisting of a plastic pipe in accorance with the preamble of claim 1.

Pipes made both of concrete and of plastic are known. In the latter case, they are mainly drawn from plastic, whereas the pipes produced from concrete are manufactured in an upright form known per se with a displaceable core. These pipes, which are largely used in drainage systems, are subject to demands within the framework of environmental protection which are increasing all the time and which hardly satisfy today's needs any more. This is above all due to the fact that they corrode faster under wastewater which is more and more aggressive and of high acid content and therefore become leaky or are destroyed. Such corrosion, however, also makes a constant replacement and ultimately a relaying of new pipes necessary more frequently than was required only a few years ago. To avoid these disadvantages, it has already become known to manufacture concrete pipes in conjunction with a plastic pipe. Since these pipes are rigidly connected in a customary manner, like concrete pipes, in each case with their one spigot end inserted into the next following wide pipe end of socket shape, these spigots break easily. These pipes are moreover exposed to strain-induced cracking of the concrete body and/or to a bursting of the concrete pipe ends which have been plugged together as a consequence of their rigid, solid assembly due to a lack of sufficient precautions for temperature-induced expansion possibilities of the plastic parts to the concrete parts and the concrete parts to the concrete parts so that these pipe parts are destroyed for this reason and have to be replaced with new pipes.

A concrete pipe having a corrosion-resistant inner lining consisting of a plastic pipe is already known from DE-U-8 132 729 whose one end is made as a pipe spigot end part and whose other end is made as a pipe socket end part to receive a pipe spigot end part of the following pipe, with the plastic pipe projecting by an overhang at the pipe spigot end, with an all-round peripheral grooving being arranged between the end facing end of the pipe socket end part and an all-round peripheral shoulder springing into the pipe interior at the pipe interior of the plastic pipe to receiver an elastomer sealing ring, with the overhang extending in a straight line and insertable into the pipe socket end part being so long that it covers the peripheral grooving with its sealing ring and with the pipe made of concrete covering the plastic pipe up to the insertable overhang of the pipe spigot end part, with the all-round peripheral shoulder of the inwardly lying plastic pipe being chamfered.

A pipe made of concrete having a corrosion-resistant inner lining made of plastic is known from DE-U-8 806 158 in which a bond-tight union takes place between the concrete jacket and the plastic liner. This can result in stress-induced destruction due to the different thermal expansion coefficient of the materials in practical use.

Finally, a concrete pipe is known from EP 426 147 B 1. With this concrete pipe, the pipe spigot end part consisting of a plastic is already sealed by a seal with respect to the pipe interior of the adjacent pipe likewise consisting of plastic. An all-round peripheral, annular seal made of flexible material is furthermore arranged between the pipe socket end part consisting only of concrete and the concrete pipe spigot end part of the adjacent pipe. These pipes have been able to establish themselves as corrosion-resistant pipes for some years due to their obvious advantages. However, it can be found with these pipes that they do not always withstand the obligatory air pressure test after being laid. This means that leaky points can arise in the region of the pipe transitions through which the pumped-in compressed air can escape.

SUMMARY OF THE INVENTION

It is the object of the invention to further develop the generic concrete pipes having a corrosion-resistant inner lining consisting of plastic such that they can be laid to form tight pipelines which also withstand a customary air pressure test.

In accordance with the invention, the object is solved by the combination of the features herein. Accordingly, a concrete pipe having a corrosion-resistant inner lining consisting of plastic whose one end is made as a pipe spigot end part and whose other end is made as a pipe socket end part to receive a pipe spigot end part of the following pipe is provided, with the plastic pipe projecting by an overhang at the pipe spigot end pipe, with an all-round peripheral groove being arranged at the pipe interior of the plastic pipe to receive an elastic sealing ring, with the overhang extending in a straight line and pluggable into the pipe socket end part being so long that it covers the peripheral groove and with the inner lining consisting of plastic also lining the pipe socket end part of the concrete pipe. The tightness of the pipe is ensured by this additional lining of the socket, with a corresponding arrangement of a seal in the region between the socket end part and the pipe spigot end part of the adjacent pipe, to the extend that here the pipeline withstands an air pressure test after being laid.

Preferred aspects of the invention result from the description herein.

The inner lining of the concrete pipe consisting of plastic can thus also cover the abutting surface of the pipe socket end part. The chipping of the brittle concrete during the handling of the pipes thereby has a particularly advantageous effect and prevents an unwanted impact of the pipe socket edge at an obstacle.

In accordance with a further advantageous aspect of the invention, the inner lining of the concrete pipe consisting of plastic merges in one piece from the pipe socket end part to the pipe. No abutment position or welding seam therefore has to be provided here.

An all-round peripheral groove to receive an elastomer sealing ring is particularly advantageously arranged in the region of the pipe socket end part at the pipe interior of the plastic pipe. The sealing ring, which is to be provided between the pipe socket end part, on the one hand, and the concrete pipe spigot end part of the adjacent pipe, can be reliably and securely positioned by this measure. The spigot end seal previously to be provided is replaced by the elastomer seal which is inserted into this all-round peripheral groove.

BACKGROUND OF THE INVENTION

Further features, details and advantages of the invention will be explained in more detail with reference to an embodiment shown in the drawing.

Figure 2:
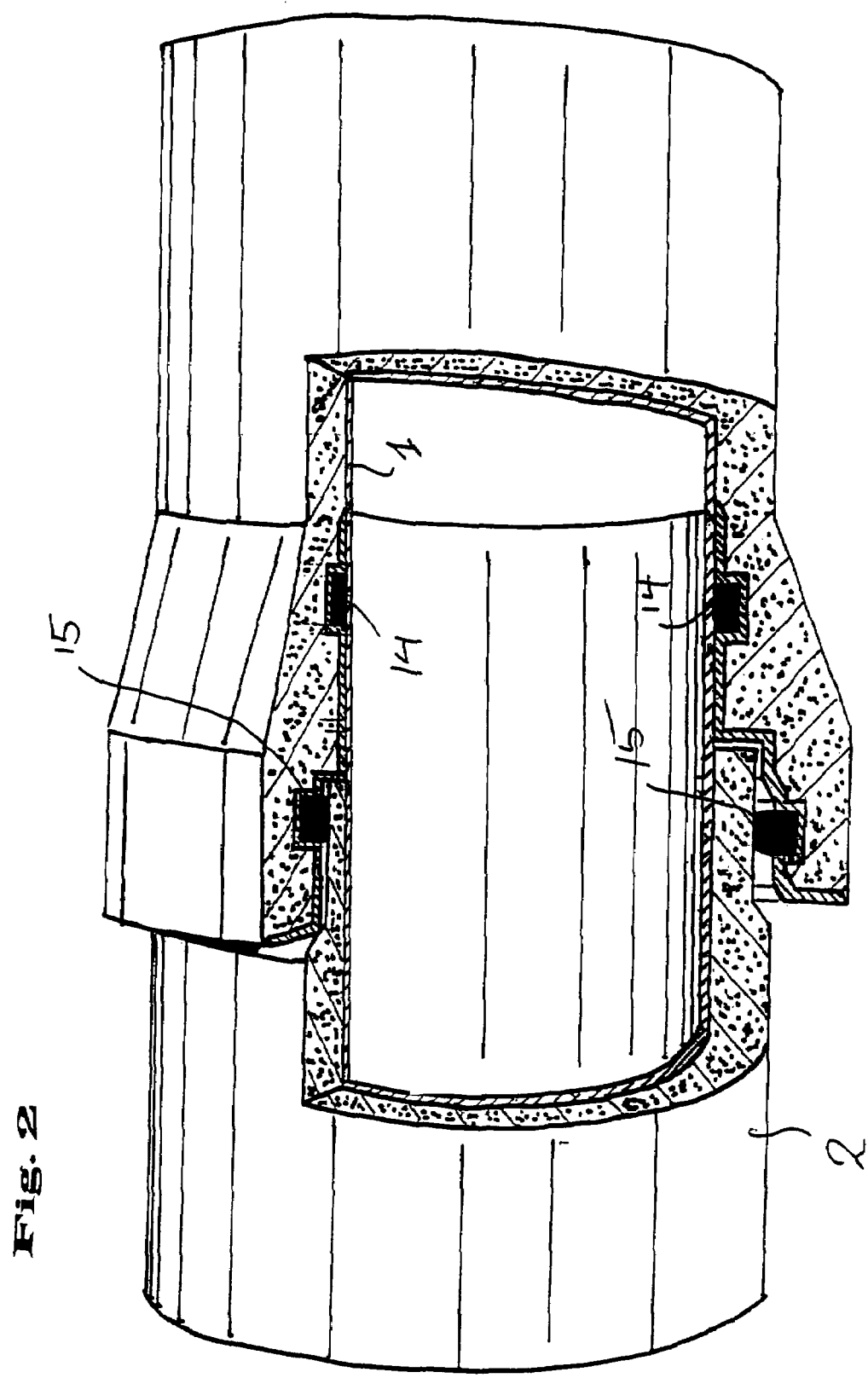

There are shown:

FIG. 1: a plurality of laid pipes in partial view in a schematic representation in section; and FIG. 2: a partial view of a pipe section of a connection of two fully laid pipes in a perspective representation.

Description of the Preferred Embodiments

A plastic pipe 1 is shown in FIG. 1 which is provided with a concrete jacket 2, with the plastic pipe serving as a corrosion-resistant, liquid-tight inner lining of the concrete pipe 2, of which one end is made as a pipe spigot end part 3 and the other end is made as a pipe socket end part 4, with the concrete pipes being connected to one another to form a pipeline via the end parts 3 and 4. The pipe spigot end part 3 of the one pipe is inserted into the pipe socket end part of the other pipe. An overhang 5 of the plastic pipe 1, with which the latter projects beyond the concrete pipe 2 or its concrete jacket 2, here serves as an adjustment and insertion aid. For the correct fixing of the pipes to be connected to one another, the inner wall 6 of the pipe socket end part 4 is provided with an all-round peripheral shoulder 8 which springs back into the interior 7 of the pipe and on which the end facing end 9 of the plastic pipe overhang 5 can be supported. The end facing end 9 and the shoulder 8 are expediently chamfered in the flow direction of the waster water and the like to be conveyed in the pipe in order to avoid congestions of the liquid on contamination collections in the gap region, as is also shown in FIG. 1.

The height of the shoulder 8 here substantially corresponds to the wall thickness of the plastic pipe 1 forming the overhang.

An all-round peripheral groove 13 facing the interior 7 of the pipe is furthermore provided in the pipe socket end part 4 of the plastic pipe between the plastic pipe socket end and the shoulder 8 in which groove an annular, advantageously flat seal made of a natural or a synthetic flexible material, e.g. latex, can be introduced. The flat annular shape should be preferred over a round-shaped one, since it can be seated firmly and undisplaceably in the groove 13, which is advantageously rectangular in its cross-section. The straight overhang 5, which can be inserted into the pipe section end part, must be so long here that it covers the peripheral groove with its seal 14, on the one hand, and can be supported at its end facing end 9 at the shoulder 8, on the other hand, (cf. FIG. 2).

However, the plastic pipe does not only cover the inner wall 6 of the pipe, but also the inner wall region of the pipe socket end part 4. The outer edge of the pipe socket end part 20 is also covered by the plastic pipe 1. The plastic pipe 1 is made in one piece, i.e. no abutment seam, for example a welding seam, is present here at the transition from the concrete pipe 2 to the pipe socket end part 4.

In the region of the pipe socket end part, a further groove 21 is cut-out in the plastic pipe 1 in which likewise a seal 15 is arranged which is made of natural or synthetic flexible material, for example latex.

As further shown in FIG. 2, a shoulder 22 is provided in the pipe socket end part.

The multiple-unit pipes manufactured in accordance with the invention do not only permit a very good seal against liquid discharge with only a few seals 14 and 15, but also an overlapping direct connection without intermediate pieces of the concrete/plastic multiple-unit pipes to one another by their overhang 5 on each pipe end. A largely air-pressure tight connection is also ensured by the additional lining with plastic in the region of the pipe socket end part and by a seal 15 correspondingly to be provided in this region, with it being further improved in that a groove 21 is cut out in the plastic pipe in the region of the pipe socket end part in which groove a sealing ring 15 is seated. A large axial and lateral freedom of movement is also present by the flexible seal and sealing means 14, 15 for the stretching and compressing of the pipes in their connection regions and between the concrete pipe and the plastic coating so that corresponding strains due to temperature influences or temperature fluctuations which result in cracking or even destruction of the pipes can thereby be compensated. In addition, the intermediate connection pieces such as double-socket connection pieces which are required in the pipe for the connection and sealing of the connection position together with their seals 14 required for each of the two pipe ends such as are usual in a known concrete/plastic compound pipe are expendable due to the now possible overlapping direct pipe connection.

The invention claimed is:

1. A concrete pipe (2) comprising the combination of:
    a single corrosion-resistant inner lining (1) of plastic,
    two opposite ends, one end of which is shaped to protrude as a pipe spigot end part (3) and an opposite end of which is shaped as a pipe socket end part (4) to receive a pipe spigot end part (3) of a following pipe (2),
    the single corrosion-resistant inner lining (1) of plastic projecting past the respective pipe spigot end part (3) to form an inwardly-situated overhang (5) from a pipe joint formed by respective mating of spigot (3) and socket (4) end parts to define part of an inner annular surface of the pipe (2) directly contacting the inner lining (1) of a pipe member having the adjacent socket end part (4) and directly covering the pipe joint from the inner annular direction and mate with a single corrosion-resistant lining (1) of plastic situated annularly outwardly therefrom upon the following pipe (2),
    an annular peripheral groove (13) being arranged at an interior (7) of the inner plastic lining (1) to accept an elastomer seal (14), with an adjacent overhang (5) covering the peripheral groove (13) when respective socket (4) and spigot (3) end parts are mated,
    the single inner lining (1) of plastic also lining the pipe socket end part (4) of the concrete pipe (2) to face the adjacent spigot end part (3) of a following pipe (2) when mated, without any abutment seam being present along the plastic lining (1) at a transition to the pipe socket end part (4), and
    the single inner lining of plastic (1) merging in one piece from an outer end of the pipe socket end part (4) to the pipe spigot end part (3) without any abutment position or welding seam.

2. A concrete pipe (2) having a corrosion-resistant inner lining (1) of plastic in accordance with claim 1, wherein the single inner lining (1) of plastic also covers (20) an abutting surface of the pipe socket end part (4).

3. A concrete pipe (2) having a corrosion-resistant inner lining of plastic (1) in accordance with claim 1, additionally comprising
    an additional peripheral groove (21) arranged in a region of the pipe socket end part (4) at the interior of the inner lining of plastic (1), to accept an additional elastomer seal (15) in the form of a sealing ring, and face the pipe spigot end part (3) when respective pipe spigot (3) and socket (4) end parts are mated together.

4. A concrete pipe having a corrosion-resistant inner lining of plastic (1) in accordance with claim 2, additionally comprising
an all-round peripheral groove (21) arranged in a region of the pipe socket end part (4) at the interior of the inner lining of plastic (1), to accept an additional elastomer seal (15) in the form of a sealing ring, and face the pipe spigot end part (3) when respective pipe spigot (3) and socket (4) end parts are mated together.

5. A concrete pipe (2) having a corrosion resistant inner lining of plastic (1) in accordance with claim 1, wherein an inner wall (6) of the pipe socket end part (4) comprises a peripheral shoulder (8) chamfered in direction of ultimate fluid flow through the pipe (2) to securely receive and support an end (9) of the overhang (5) projecting past the respective pipe spigot end part (3).

6. A concrete pipe (2) having a corrosion resistant inner lining of plastic (1) in accordance with claim 3, wherein said peripheral grooves (13, 21) each have a rectangular cross-section.

7. A pipe, comprising the combination of
an outer annular concrete portion (2),
a single inner annular lining of plastic (1) arranged to contact fluid flow therethrough,
said pipe shaped to have two opposite ends, one end of which is shaped as a spigot (3) and an opposite end of which is shaped as a socket (4) such that respective spigot (3) and socket (4) ends of an adjacent pipe mate upon coupling to form a pipe joint,
said single inner lining (1) of plastic arranged to project beyond the spigot end (3) and form an inwardly-situated overhang (5) from the pipe joint formed upon coupling to define part of an inner annular surface of the pipe (2) directly contacting the inner lining (1) of a pipe member having the adjacent socket end part (4) and directly covering the pipe joint from the inner annular direction and mate with an adjacent single corrosion-resistant lining (1) of plastic situated annularly outwardly therefrom upon the adjacent pipe (2),
an annular peripheral groove (13) arranged in an interior (7) of the inner plastic lining (1) to accept an elastomer seal (14), and with an adjacent overhang (5) arranged to inwardly cover both the peripheral groove (13) and seal (14) therein upon coupling the adjacent pipes to form the pipe joint, and
the single inner lining (1) of plastic also lining the pipe socket end (4) of the concrete portion (2) and facing the adjacent spigot end (3) upon coupling and merging in one piece from an outer end of the pipe socket end (4) to the pipe spigot end part (3), without any abutment seam being present along the plastic lining (1) at a transition to the pipe socket end part (4).

8. A pipe in accordance with claim 7, wherein an inner wall (6) of the pipe comprises a peripheral shoulder (8) chamfered in direction of fluid flow to securely receive and support an end (9) of the overhang (5) projecting past the respective pipe spigot end (3).

9. A pipe in accordance with claim 8, comprising
an additional peripheral groove (21) arranged in the pipe socket end (4) to accept an additional elastomer seal (15) and face the respective pipe spigot end (3) upon coupling.

10. A pipe in accordance with claim 7, comprising an additional peripheral groove (21) arranged in the pipe socket end (4) to accept an additional elastomer seal (15) and face the respective pipe spigot end (3) upon coupling.

11. A pipe in accordance with claim 10, wherein said peripheral grooves (13, 21) each have a rectangular cross-section.

12. A concrete pipe (2) having a corrosion resistant inner lining of plastic (1) in accordance with claim 2, wherein an inner wall (6) of the pipe socket end part (4) comprises a peripheral shoulder (8) chamfered in direction of ultimate fluid flow through the pipe (2) to securely receive and support an end (9) of the overhang (5) projecting past the respective pipe spigot end part (3).

13. A concrete pipe (2) having a corrosion resistant inner lining of plastic (1) in accordance with claim 3, wherein an inner wall (6) of the pipe socket end part (4) comprises a peripheral shoulder (8) chamfered in direction of ultimate fluid flow through the pipe (2) to securely receive and support an end (9) of the overhang (5) projecting past the respective pipe spigot end part (3).

14. A concrete pipe (2) having a corrosion resistant inner lining of plastic (1) in accordance with claim 4, wherein an inner wall (6) of the pipe socket end part (4) comprises a peripheral shoulder (8) chamfered in direction of ultimate fluid flow through the pipe (2) to securely receive and support an end (9) of the overhang (5) projecting past the respective pipe spigot end part (3).

15. A concrete pipe (2) having a corrosion-resistant inner lining (1) of plastic in accordance with claim 7, wherein the single inner lining (1) of plastic also covers (20) an abutting surface of the pipe socket end part (4).

\* \* \* \* \*